(12) United States Patent
Railkar et al.

(10) Patent No.: US 10,827,413 B2
(45) Date of Patent: Nov. 3, 2020

(54) ROUTING OPTIMIZATION BASED ON HISTORICAL NETWORK MEASURES

(71) Applicant: AT&T Intellectual Property I, L.P., Atlanta, GA (US)

(72) Inventors: Abhijit Railkar, Plano, TX (US); Mark D. Austin, Allen, TX (US); Paul Ireifej, Holmdel, NJ (US); Sheldon Kent Meredith, Roswell, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 88 days.

(21) Appl. No.: 16/155,410

(22) Filed: Oct. 9, 2018

(65) Prior Publication Data
US 2020/0112905 A1  Apr. 9, 2020

(51) Int. Cl.
*H04W 40/14* (2009.01)
*H04L 12/721* (2013.01)
*H04W 84/04* (2009.01)

(52) U.S. Cl.
CPC .......... *H04W 40/14* (2013.01); *H04L 45/70* (2013.01); *H04W 84/042* (2013.01)

(58) Field of Classification Search
CPC ...... H04W 40/14; H04W 84/042; H04L 45/70
See application file for complete search history.

(56) References Cited

U.S. PATENT DOCUMENTS

| | | | |
|---|---|---|---|
| 8,514,704 B2 | 8/2013 | Fraccalvieri et al. | |
| 8,937,870 B1 | 1/2015 | Callaghan | |
| 9,001,666 B2 | 4/2015 | Boerjesson | |
| 9,306,835 B2 | 4/2016 | An et al. | |
| 9,483,338 B2 | 11/2016 | Bhalla et al. | |
| 9,813,379 B1* | 11/2017 | Shevade | H04L 63/0272 |
| 9,853,906 B2 | 12/2017 | Atkins et al. | |
| 9,860,788 B2 | 1/2018 | Cui et al. | |
| 2009/0252102 A1 | 10/2009 | Seidel et al. | |
| 2011/0164527 A1* | 7/2011 | Mishra | H04L 45/123 370/252 |
| 2014/0233439 A1 | 8/2014 | Hong et al. | |
| 2014/0280899 A1 | 9/2014 | Brewster, Jr. et al. | |
| 2018/0091413 A1 | 3/2018 | Richards et al. | |

* cited by examiner

*Primary Examiner* — Ricky Q Ngo
*Assistant Examiner* — Stephen N Steiner

(57) ABSTRACT

In one example, a first plurality of health scores and a second plurality of health cores are calculated. The first plurality of health scores quantifies the health of a plurality of nodes in a telecommunication service provider network, where the plurality of nodes represents connectivity points in the network. The second plurality of health scores quantifies the health of a plurality of links connecting the plurality of nodes. A priority score is calculated that quantifies an importance of a traffic demand. A route over the plurality of nodes and the plurality of links is generated, based at least in part on the first plurality of health scores, the second plurality of health scores, and the priority score. The route delivers the traffic demand from a source to a destination in a manner that meets a need of the traffic demand without exceeding the need by more than the threshold.

18 Claims, 3 Drawing Sheets

ROUTING OPTIMIZATION BASED ON HISTORICAL NETWORK MEASURES

The present disclosure relates generally to network communications, and relates more particularly to devices, computer-readable media, and methods for optimizing the routing of communications through networks based on historical network measures.

BACKGROUND

A conventional communications network typically comprises a collection of interconnected nodes and links, where each node may broadly represent a connectivity point, and each link may represent a physical or virtual connection between two connectivity points. The network may employ an optimization technique that determines, for each packet or set of packets, the optimal route over the nodes and links that will deliver the packets from a source to a destination. What is optimal in such a case may vary depending on different considerations. For instance, in one case, the most optimal route may be the route that is quickest; in another case, the most optimal route may be the route that experiences the least amount of packet loss. In many cases, the optimality of a route may be based on a combination of considerations.

SUMMARY

In one example, a method includes calculating a first plurality of health scores, where each health score of the first plurality of health scores quantifies a health of a node in a telecommunication service provider network, and where the node is one of a plurality of nodes representing a plurality of connectivity points in the telecommunication service provider network, calculating a second plurality of health scores, where each health score of the second plurality of health scores quantifies a health of a link in the telecommunication service provider network, and where the link is one of a plurality of links connecting individual nodes of the plurality of nodes, calculating a priority score that quantifies an importance of a traffic demand supported by the telecommunication service provider network, and generating a route using some of the plurality of nodes and some of the plurality of links, wherein the route is calculated based at least in part on the first plurality of health scores, the second plurality of health scores, and the priority score, and wherein the route delivers the traffic demand from a source to a destination in a manner that meets a need of the traffic demand without exceeding the need of the traffic demand by more than the threshold.

In another example, a non-transitory computer-readable medium stores a first set of instructions which, when executed by a processor, cause the processor to perform operations. The operations include calculating a first plurality of health scores, where each health score of the first plurality of health scores quantifies a health of a node in a telecommunication service provider network, and where the node is one of a plurality of nodes representing a plurality of connectivity points in the telecommunication service provider network, calculating a second plurality of health scores, where each health score of the second plurality of health scores quantifies a health of a link in the telecommunication service provider network, and where the link is one of a plurality of links connecting individual nodes of the plurality of nodes, calculating a priority score that quantifies an importance of a traffic demand supported by the telecommunication service provider network, and generating a route using some of the plurality of nodes and some of the plurality of links, wherein the route is calculated based at least in part on the first plurality of health scores, the second plurality of health scores, and the priority score, and wherein the route delivers the traffic demand from a source to a destination in a manner that meets a need of the traffic demand without exceeding the need of the traffic demand by more than the threshold.

In another example, a device includes a processor and a computer-readable medium storing a set of instructions which, when executed by the processor, cause the processor to perform operations. The operations include calculating a first plurality of health scores, where each health score of the first plurality of health scores quantifies a health of a node in a telecommunication service provider network, and where the node is one of a plurality of nodes representing a plurality of connectivity points in the telecommunication service provider network, calculating a second plurality of health scores, where each health score of the second plurality of health scores quantifies a health of a link in the telecommunication service provider network, and where the link is one of a plurality of links connecting individual nodes of the plurality of nodes, calculating a priority score that quantifies an importance of a traffic demand supported by the telecommunication service provider network, and generating a route using some of the plurality of nodes and some of the plurality of links, wherein the route is calculated based at least in part on the first plurality of health scores, the second plurality of health scores, and the priority score, and wherein the route delivers the traffic demand from a source to a destination in a manner that meets a need of the traffic demand without exceeding the need of the traffic demand by more than the threshold.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media, and methods for routing optimization based on historical network measures. As discussed above, a conventional communications network typically comprises a collection of interconnected nodes and links, where each node may broadly represent a connectivity point, and each link may represent a physical or virtual connection between two connectivity points. The network may employ an optimization technique that determines, for each packet or set of packets, the optimal route over the nodes and links that will deliver the packets from a source to a destination.

Conventional techniques, however, may sacrifice overall network optimization for local optimization. For instance, optimization may be limited to instances where new nodes and links are configured, or may rely on historical mobile device locations which are susceptible to change. Moreover, the failure to optimize diversity paths for network traffic links may increase jitter, packet order errors, maintenance costs, latency, session failure, traffic congestion, and/or low or inefficient utilization of network assets.

Examples of the present disclosure dynamically optimize the configuration of a network, in real time, for reliability as a function of cost (e.g., the change in reliability divided by the change in cost). In one example, the disclosure makes use of pre-built routing tables, but also performs analysis of routes based on historical network measures in order to optimize the routes in real time. As a result, the network's various traffic demands may be assigned to routes that meet, but do not exceed (or do not exceed by more than a threshold), the needs of the traffic demands. Thus, the network's assets are utilized in the most optimal manner, while the deployment of additional assets that may be under-utilized is minimized.

Within the context of the present disclosure, a "node" is understood to refer to a connectivity point in a network, such as a switch, a bridge, a modem, a hub, or a terminal points (e.g., a mobile device, a computer, a server, or a workstation). A "super node" is understood to refer to a collection of nodes. Furthermore, a "link" is understood to refer to a connection between two connectivity points. A "span" is understood to refer to a series of connected links, while a "link sequence" is understood to refer to the sequence of links in a span, from the source node to the destination node. A "bundle" is understood to refer to a collection of spans.

Figure 1:
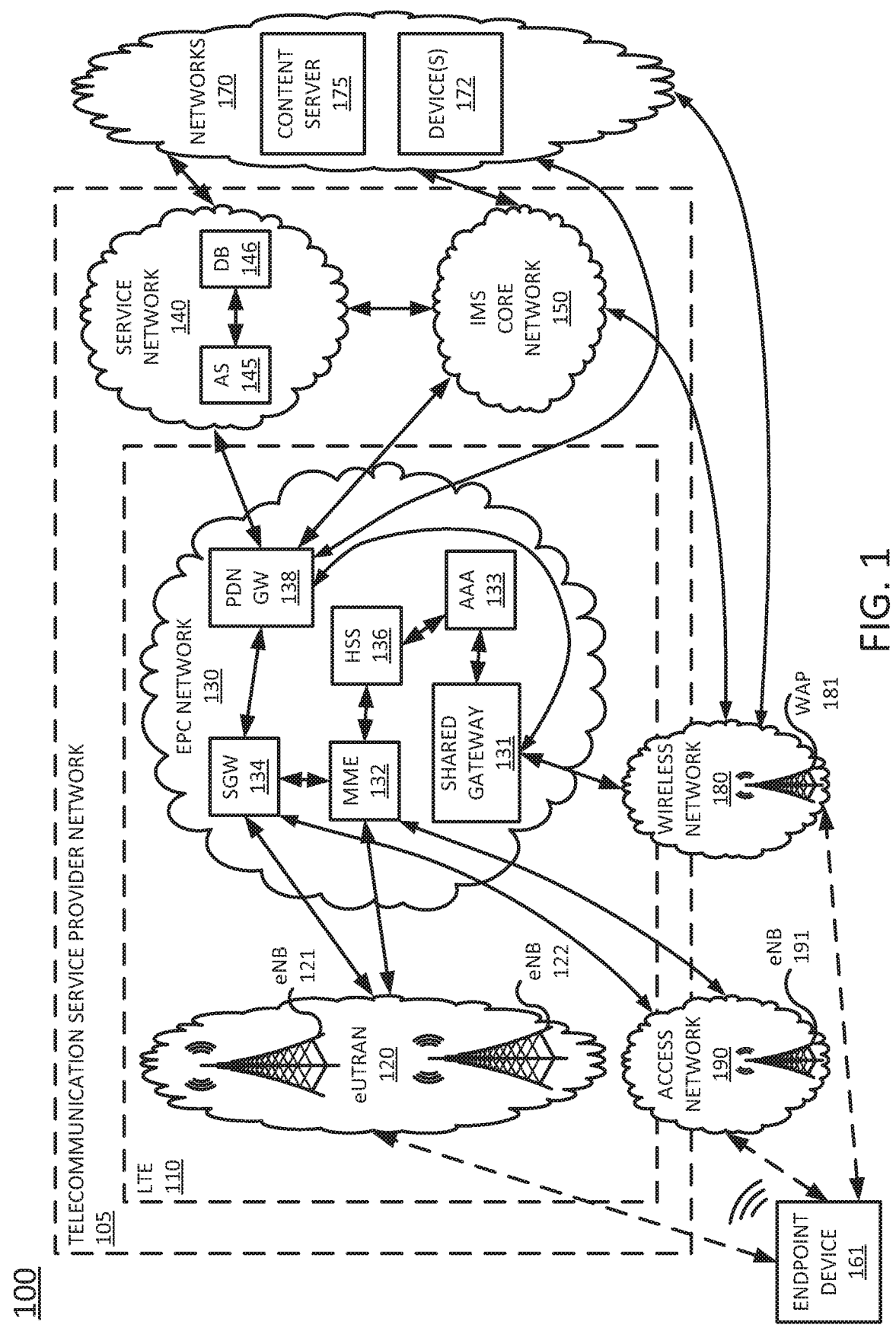
FIG. 1 illustrates an example network, or system that may implement examples of the present disclosure.

To aid in understand the present disclosure, FIG. 1 illustrates an example network, or system 100 that may implement examples of the present disclosure. In one example, the system 100 includes a telecommunication service provider network 105. The telecommunication service provider network 105 may comprise a Long Term Evolution (LTE) network 110, a service network 140, and a core network, e.g., an IP Multimedia Subsystem (IMS) core network 150. The system 100 may further include other networks 170 connected to the telecommunication service provider network 105. As shown in FIG. 1, the system 100 may connect endpoint device 161 with an application server (AS) 145 in service network 140, with content servers 175 in networks 170, and/or with other components of telecommunication service provider network 105. The endpoint device 161 may comprise a cellular telephone, a smartphone, a tablet computing device, a laptop computer, a pair of computing glasses, a wireless enabled wristwatch, or any other wireless and/or cellular-capable mobile telephony and computing device (broadly, a "mobile endpoint device"). In one example, the endpoint device 161 may comprise a device of a subscriber or customer of the telecommunication service provider network 105.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3rd Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeB (eNB) 121 and eNodeB (eNB) 122 in the eUTRAN 120, are in communication with the EPC network 130. In operation, LTE user equipment or user endpoints (UE), such as endpoint device 161, may access wireless services via the eNodeBs 121 and 122 located in eUTRAN 120. It should be noted that any number of eNodeBs can be deployed in a eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 130 may comprise a Home Subscriber Server (HSS) 136 that contains subscription-related information (e.g., subscriber profiles), registration data, and network policy rules, and that performs authentication and authorization of a wireless service user. Thus, HSS 136 may store information regarding various subscriber/customer devices, such as endpoint device 161. HSS 136 may also maintain and provide information about subscribers' locations. In one example, Authentication, Authorization, and/or Accounting (AAA) server 133 obtains subscriber profile information form HSS 136 to authenticate and authorize endpoint devices to connect to EPC network 130 via Institute for Electrical and Electronics Engineers (IEEE) 802.11 (Wi-Fi)/non-3GPP access networks. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW. In one example, system 100 may also include an application server (AS) 135.

In one example, service network 140 may comprise one or more devices, such as application server (AS) 145 for providing services to subscribers, customers, and or users. For example, telecommunication service provider network 105 may provide a cloud storage service, web server hosting, and other services. As such, service network 140 may represent aspects of telecommunication service provider network 105 where infrastructure for supporting such services may be deployed. In one example, AS 145 may comprise a computing system, such as computing system 300 depicted in FIG. 3, specifically configured to perform operations relating to transferring data over multiple network paths using decoupled sub-flows. For instance, AS 145 may be configured to perform all or some of the operations described below in connection with the method 200 and illustrated in FIG. 2. Although a single application server, AS 145, is illustrated in service network 140, it should be understood that service network 140 may include any number of components to support one or more services that may be provided to one or more subscribers, customers, or users by the telecommunication service provider network 105.

Thus, in another example AS 145 may represent multiple devices which collectively function as a content server.

The service network 140 may further comprise a database (DB) 146 that is communicatively coupled to the AS 145. The DB146 may store historical network measure data for the network 100, including, for example, link and node attributes and traffic data. The link and node attributes may include the locations of nodes, the distances of the links connecting nodes, the types of node-link connectivity, the collective aggregation or bundling of nodes, the collective aggregation or bundling of links, the capacities of the links to carry network traffic, the recent utilization of nodes and links by time period, the utilization histories of nodes and links by time period, the historical reliability of the nodes, the historical reliability of the links, the propensities of the nodes to fail, the propensities of the links to fail, the ages and maintenance histories of the nodes, the ages and maintenances histories of the links, and/or the intelligent routing capabilities (if any) of the nodes. The traffic data may include the current bandwidth demands, projected bandwidth demands by time period, the current sources of the network traffic, the projected sources of the network traffic, the current destinations of the network traffic, the projected destinations of the network traffic, the current types of network traffic, and/or the projected types of network traffic by time period. The link and node attributes and traffic data may be collected using one or more auto-discovery techniques.

In a further example, the DB 146 may also store rules for network planning, These rules may include rules for aggregating nodes into super-nodes, rules for aggregating links into spans and/or bundles, and/or rules for diversifying traffic flows across the network 100. The rules may be defined by an operator of the telecommunication service provider network 105. All of some of the data stored in the database 146 may be used to perform all or some of the operations described below in connection with the method 200 and illustrated in FIG. 2. For instance, the data may be used to calculate health scores for nodes and links in the network 100.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. In one example, the other networks 170 may represent the Internet in general. Devices 172 may include servers, such as web servers, storage devices, enterprise servers, email servers, and so forth. Devices 172 may also include personal computers, desktop computers, laptop computers, personal digital assistants (PDAs), tablet computing devices, or any other devices for wireless and/or wired communications. In one example, endpoint device 161 may communicate with devices 172 in networks 170 via PDN GW 138 and/or via PDN GW 138 and IMS core network 150, e.g., for voice over LTE (VoLTE)-based calls or Wi-Fi calling.

In accordance with the present disclosure, networks 170 may also include one or more content servers 175. In one example, content servers 175 may each comprise a device, such as computing system 300 depicted in FIG. 3, specifically configured to perform operations relating to routing optimization. For instance, content servers 175 may be configured in the same or a similar manner as described above in connection with AS 145.

In one example, system 100 may also include an access network 190 with an eNodeB (eNB) 391. The eNodeB 191 may comprise, for example, a home eNodeB (HeNB), a "small cell," such as a femtocell, a microcell, etc., and/or a "low power" eNodeB. For instance, eNB 191 may have a range of two kilometers or less, while eNodeBs 121 and 122 may have a range of up to thirty-five kilometers or more. In one example, access network 190 and eNB 191 may connect to EPC network 130 via a subscriber/customer broadband connection. For instance, access network 190 may comprise a home network of a customer/subscriber and eNodeB 191 may connect via a home gateway (not shown) or similar equipment deployed at the customer premises to SGW 134 and MME 132 in EPC network 130, e.g., via S1 interfaces. While access network 190 may comprise a home network, eNodeB 191 may continue to be managed by telecommunication service provider network 105 or may be managed by a customer/subscriber associated with access network 190.

In another example, both access network 190 and eNodeB 191 may be controlled and/or managed by telecommunication service provider network 105. In other words, access network 190 and eNodeB 191 may be part of telecommunication service provider network 105 and/or LTE network 110. For instance, an operator of telecommunication service provider network 105 may add access network 190 and eNodeB 115 as a small cell, picocell, femtocell, or the like to fill gaps in coverage of macro-cells or to temporarily support larger numbers of endpoint devices in an area, e.g., at a concert, sporting event, or other large gathering. In still another example, access network 190 may comprise a portion of a peer network, e.g., of a different telecommunication service provider.

In one example, EPC network 130 may also include a shared gateway 131. In one example, shared gateway 131 may comprise an evolved packet data gateway (ePDG), a trusted wireless local area network (WLAN) authentication, authorization, and accounting (AAA) proxy (TWAP), and a trusted WLAN access gateway (TWAG). In other words, shared gateway 131 may comprise a device that is configured to provide functions of all of an ePGD, a TWAP and a TWAG. In one example, ePDG functionality of the shared gateway 131 may process traffic from endpoint devices accessing the EPC network 130 via untrusted wireless networks (e.g., IEEE 802.11/Wi-Fi networks), while TWAP/TWAG functionality of shared gateway 141 may process traffic from endpoint devices accessing the EPC network via trusted wireless networks (e.g., IEEE 802.11/Wi-Fi networks). Wireless networks and WAPs may be designated as "trusted" or "untrusted" based upon several factors, such as whether the wireless network is a customer or subscriber network, or a peer network, e.g., of a different telecommunication service provider, based upon a model or type of WAP, and so forth. In addition, as referred to herein, "traffic" may comprise all or a portion of a transmission, e.g., a sequence or flow, comprising one or more packets, segments, datagrams, frames, cells, protocol data units, service data unit, bursts, and so forth. The particular terminology or types of data units involved may vary depending upon the underlying network technology. Thus, the term "traffic" is intended to refer to any quantity of data to be sent from a source to a destination through the system 100.

In accordance with the present disclosure, a number of network interfaces may be available to endpoint device 161 to communicate with AS 145 and/or content servers 175, e.g., to obtain digital data. For instance, a first network interface may be available via eUTRAN 120 and eNodeBs 121 and 122, e.g., a "cellular interface." A second network interface may be available via wireless network 180 and WAP 181, e.g., a "Wi-Fi interface." In addition, a third network interface may be available via access network 190 and eNodeB 191, e.g., a second "cellular interface." Although not illustrated in FIG. 1, other network interfaces may be available, such as additional Wi-Fi interfaces, a wired interface, e.g., via a wired Ethernet local area network (LAN), a satellite downlink (and/or a satellite link with both uplink and downlink support), and so forth. As such, in one example, endpoint device 161 may provide a user interface to enable a user of endpoint device 161 to select a preferred network interface as a primary interface for an MPTCP connection. In one example, the user interface may further enable the user of endpoint device 161 to select one or more additional interfaces as secondary interfaces (and alternatively, to designate certain interfaces as being unavailable for an MPTCP connection). In one example, the endpoint device 161 may open one or more transmission control protocol (TCP) sessions (or other transport layer sessions, such as uniform datagram protocol (UDP) sessions) for each of the available network interfaces.

In this regard, it should be noted that as referred to herein, when a network interface is enabled or disabled, this may similarly refer to enabling or disabling a "sub-flow" (e.g., a TCP flow for one of the network interfaces). As noted above, the term "path" may also be used to describe a route through a network associated with the transport of packets in connection with a "sub-flow" associated with a network interface. Endpoint device 161 may therefore utilize any one or more of the network interfaces to request digital data, e.g., from AS 145 and/or one or more of content servers 175.

It should be noted that the system 100 has been simplified. In other words, the system 100 may be implemented in a different form than that which is illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, shared gateway 131 and SGW 134 may be combined into a single component, AAA 133 and HSS 136 may be combined into a single component, and so forth. In addition, various elements of eUTRAN 120, EPC network 130, and IMS core network 150 may be omitted for clarity, including gateways or border elements providing connectivity between such networks, and between the network elements therein.

In addition, although aspects of the present disclosure have been discussed above in the context of a long term evolution (LTE)-based network, examples of the present disclosure are not so limited. For example, the teachings of the present disclosure can be applied to other types of cellular networks (e.g., a 2G network, a 3G network, and the like, or a future technology or standard-based network). Similarly, although the shared gateway 131, HSS 136, and AAA server 133 are illustrated as components within EPC network 130 having a particular configuration, in other examples, any one or more of these components may be deployed in a different configuration. For example, HSS 136 and/or AAA server 133 may be deployed in IMS core network 150, while other components may reside external to EPC network 130 within LTE network 110, and so on. Thus, these and other modifications are all contemplated within the scope of the present disclosure.

Figure 2:
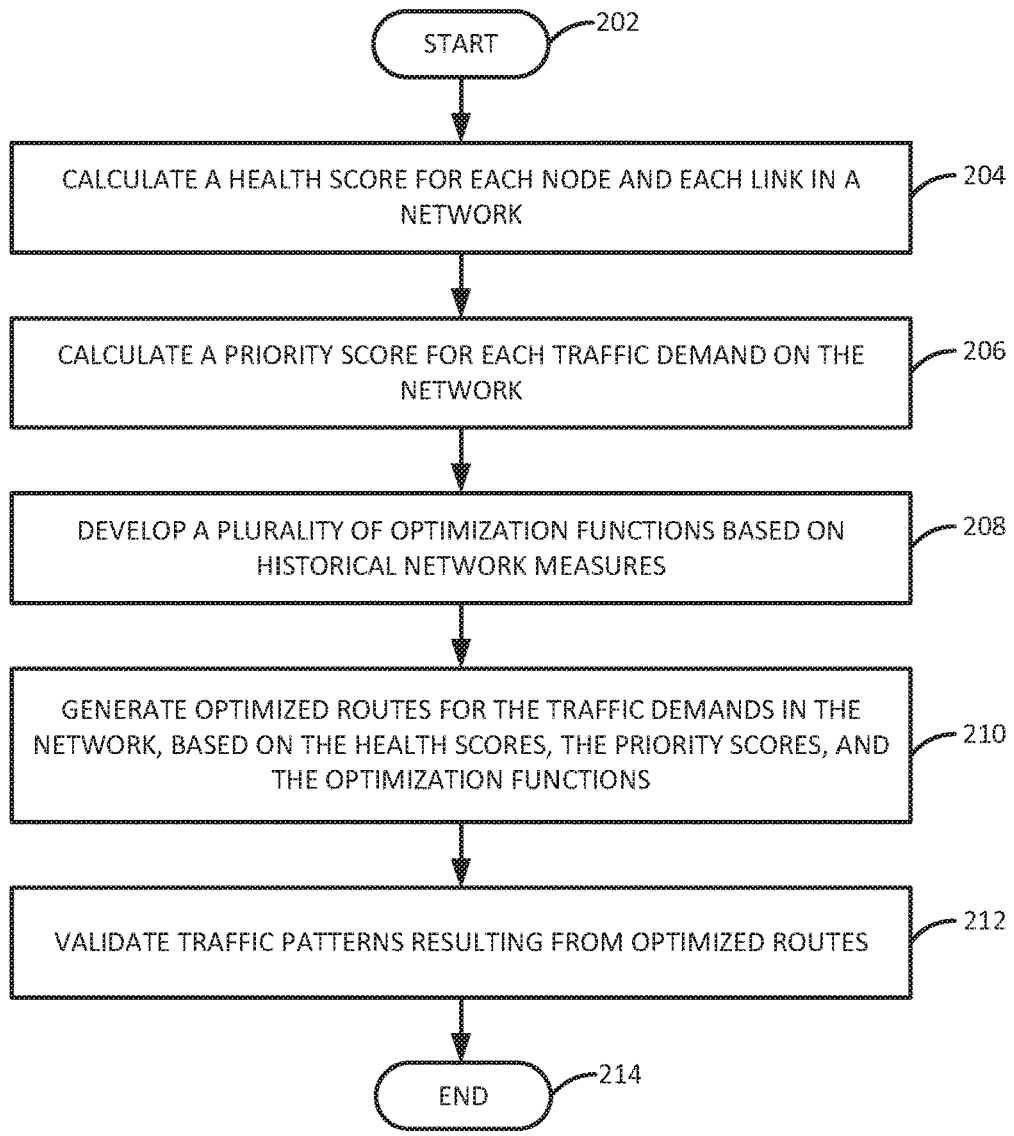
FIG. 2 is a flow diagram illustrating one embodiment of a method for routing optimization, according to the present disclosure.

FIG. 2 is a flow diagram illustrating one example of a method 200 for routing optimization, according to the present disclosure. The method 200 may be performed, for example, by the AS 145 or the content server 175 of FIG. 1. As such, reference may be made in the discussion of the method 200 to various elements of FIG. 1. However, it should be appreciated that the method 200 is not limited to implementation in a network configured exactly as illustrated in FIG. 1.

The method 200 begins in step 202. In step 204, a health score may be calculated for each node and link in a network, resulting in a first plurality of health scores (for the nodes) and a second plurality of health scores (for the links). In one example, the health score is a numerical indicator that quantifies the health of a corresponding node or link as a function of various attributes. These attributes may be described in data stored in a database (e.g., DB 146 of FIG. 1). For instance, the health score may be based on the corresponding node or link's historical reliability, maintenance history and age, utilization history, types of traffic historically supported, and/or distance (for links). As an example, a link with relatively high reliability, low utilization, and short distance may have a better (e.g., higher) health score than an older link with relatively high utilization. In one example, the attributes may be weighted with various weights, e.g., where particular attributes may be considered more significant predictors of health than others. In one example, the health score is calculated using a machine learning technique. In a further example, health scores for super-nodes, spans, and bundles can be calculated by aggregating the health scores of the nodes and links contained in the super-nodes, spans, and bundles.

Table 1, below, illustrates some example weights, link metrics, and weighted scores that may be associated with various link attributes and that may be used to calculate an example link health score:

TABLE 1

Example attributes, weights, link metrics, and weighted scores

| Attribute | Weight | Link Metric | Weighted Score |
|---|---|---|---|
| Reliability | 5 | 5 | 25 |
| Maintenance History (average failures/year) | −2 | 3 | −6 |
| Age (years) | −1 | 5 | −5 |
| Utilization History (average percentage) | −3 | 80% | −2.4 |
| Types of Traffic (1: single; 2: mixed) | 1 | 2 | 2 |
| Distance (feet [000s]) | −2 | 2.9 | −5.8 |
| Link Health Score | | | 7.8 |

Thus, in the example of Table 1, the health score for the example link is calculated as the sum of the weighted scores for the various attributes. That is, each attribute is associated with a link metric (e.g., a measured or recorded value for the attribute) and a weight. For each attribute, the link metric is multiplied by the weight to generate a weighted score. Then, all of the weighted scores for the various attributes are summed to calculate the health score.

In step 206, a priority score may be calculated for each traffic demand on the network. In one example, the traffic demands for which priority scores are calculated include both current and projected traffic demands. In one example, the priority score is a numerical indicator that quantifies how important it is for a corresponding traffic demand to be supported by the network. The priority score may be based on the corresponding traffic demand's type of traffic, revenue potential, and/or sensitivity. For instance, traffic associated with emergency services (e.g., 911 calls) may have a better (e.g., higher) priority score than Web traffic, while traffic associated with free WiFi Internet use may have a worse (e.g., lower) priority score than traffic carrying streaming video provided via a paid subscription service. In one example, these factors may be weighted with various weights, e.g., where particular factors may be considered more significant predictors of priority than others. In one example, the priority score is calculated using a machine technique algorithm.

Table 2, below, illustrates some example weights, traffic metrics, and weighted scores that may be associated with various traffic attributes and that may be used to calculate an example traffic priority score:

TABLE 2

Example attributes, weights, traffic metrics, and weighted scores

| Attribute | Weight | Traffic Metric | Weighted Score |
|---|---|---|---|
| Revenue Potential (in $MMs/year) | 7 | 3.8 | 26.6 |
| Types of Traffic (1: WiFi; 2: Video; 3: 911) | 5 | 3 | 15 |
| Traffic Priority Score | | | 41.6 |

Thus, in the example of Table 2, the priority score for the example traffic demand is calculated as the sum of the weighted scores for the various attributes. That is, each attribute is associated with a traffic metric (e.g., a measured or recorded value for the attribute) and a weight. For each attribute, the traffic metric is multiplied by the weight to generate a weighted score. Then, all of the weighted scores for the various attributes are summed to calculate the priority score.

In step 208, a plurality of optimization functions may be developed based on historical network measures. In one example, an object of the optimization functions is to aggregate nodes into super-nodes and links into spans and bundles. For instance, the optimization functions may attempt to group traffic demands having similar sources, destinations, traffic types, bandwidth demands, and/or sensitivity together. Thus, in one example, the optimization functions may include one or more of: a function to minimize the introduction of new network assets, a function to maximize the use of existing network assets, a function to minimize span lengths (e.g., so as to minimize traffic latency and jitter), a function to minimize traffic regeneration on diverse routes, a function to optimize the types of traffic spread across multiple routes, and/or a function to minimize the use of network assets while maintaining optimal route diversity.

For instance, pseudo code of an example function to maximize the use of a link based on link health scores might look like the following:

```
function LinkId(from Node, toNode, reqCapacity) {
    maxHealthScore = 0;
    returnLinkId = 0;
    for (all links between from Node and toNode) {
        if(reqCapacity < availableCapacity(thisLink)
            maxHealthScore < healthScore(thisLink))
            linkId = thisLink;
            maxHealthScore = healthScore(thisLink);
    }
    return linkId:
}
```

In step 210, optimized routes for the various traffic demands in the network are generated, based on the health scores, the priority scores, and the functions. In one example, the optimization functions are used to develop a set of rules that can be applied to intelligent nodes. Based on these rules, a set of commands can be developed that can be automatically executed on nodes in the network. The commands may cause traffic to be dynamically routed across the network. In one example, implementation of the optimized routes will ensure that the various traffic demands are assigned to routes that meet, but do not exceed (or do not exceed by more than a threshold), the needs of the traffic demands.

In one example, the commands that can be executed on the nodes may include one or more of the following commands: (1) when the link capacity between a pair of nodes reaches a predefined threshold for sensitive traffic (e.g., 75% for 911 traffic), generate a new route between the pair of nodes to cater to additional traffic; and (2) if the utilization of a link falls below a predefined threshold (e.g., 15% while carrying low priority traffic, such as voice or text messages), drop the route from the nodes and transfer the traffic to other links.

In step 212, the traffic patterns resulting from the optimized routes may be validated, e.g., to verify that the optimized routes are, in fact, routing the traffic in an optimal manner. The results of the validation (e.g., a determination as to whether the optimized routes are effective or not) can be provided as feedback to a machine learning technique to refine the health scores and/or priority scores and ultimately refine the optimized routes.

The method 200 ends in step 214.

As discussed above, a goal of the method 200 is to assign the network's various traffic demands to routes that meet, but do not exceed (or do not exceed by more than a threshold), the needs of the traffic demands. This may be achieved by increasing the capacity of the network's assets as necessary to make them available for the traffic demands that need them. This may also help to minimize spending on redundant assets that are not needed or are under-utilized.

It should be noted that although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure. The method 200 may also be expanded to include additional steps. Thus, these and other modifications are all contemplated within the scope of the present disclosure.

Figure 3:
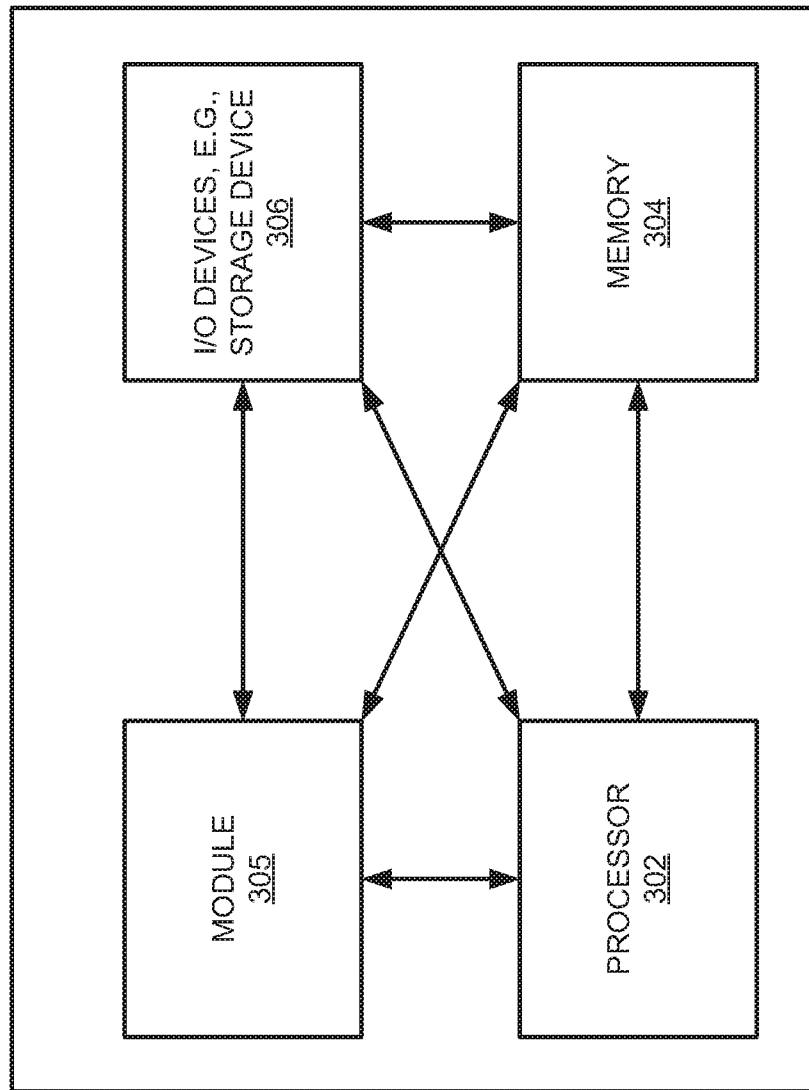
FIG. 3 illustrates an example high-level block diagram of a computer specifically programmed to perform the steps, functions, blocks, and/or operations described herein.

FIG. 3 depicts a high-level block diagram of a computing device suitable for use in performing the functions described herein. As depicted in FIG. 3, the system 300 comprises one or more hardware processor elements 402 (e.g., a central processing unit (CPU), a microprocessor, or a multi-core processor), a memory 304 (e.g., random access memory (RAM) and/or read only memory (ROM)), a module 305 for routing optimization based on historical network measures, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 discussed above is implemented in a distributed or parallel manner for a particular illustrative example, i.e., the steps of the above method 200, or the entire method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for routing optimization based on historical network measures (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for routing optimization based on historical network measures (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method, comprising:
calculating, by a processor, a first plurality of health scores, where each health score of the first plurality of health scores quantifies a health of a node in a telecommunication service provider network, and where the node is one of a plurality of nodes representing a plurality of connectivity points in the telecommunication service provider network;
calculating, by the processor, a second plurality of health scores, where each health score of the second plurality of health scores quantifies a health of a link in the telecommunication service provider network, and where the link is one of a plurality of links connecting individual nodes of the plurality of nodes;
calculating, by the processor, a priority score that quantifies an importance of a traffic demand supported by the telecommunication service provider network; and
generating, by the processor, a route using some of the plurality of nodes and some of the plurality of links, wherein the route is calculated based at least in part on the first plurality of health scores, the second plurality of health scores, the priority score, and an optimization function that is based on a historical network measure, wherein the route delivers the traffic demand from a source to a destination in a manner that meets a need of the traffic demand without exceeding the need of the traffic demand by more than a threshold, and wherein the optimization function minimizes a use of assets of the telecommunication service provider network while maintaining an optimal route diversity.

2. The method of claim 1, wherein each health score of the first plurality of health scores is calculated based on at least one attribute of the node.

3. The method of claim 2, wherein the at least one attribute of the node comprises at least one of: a historical reliability of the node, an age of the node, a maintenance history of the node, a utilization history of the node, and a type of traffic historically supported by the node.

4. The method of claim 1, wherein each health score of the second plurality of health scores is calculated based on at least one attribute of the link.

5. The method of claim 4, wherein the at least one attribute of the link comprises at least one of: a historical reliability of the link, an age of the link, a maintenance history of the link, a utilization history of the link, a type of traffic historically supported by the link, and a distance of the link.

6. The method of claim 1, wherein the priority score is calculated based on at least one attribute of the traffic demand.

7. The method of claim 6, wherein the at least one attribute of the traffic demand comprises at least one of: a type of the traffic demand, a revenue potential of the traffic demand, and a sensitivity of the traffic demand.

8. The method of claim 1, wherein the first plurality of health scores, the second plurality of health scores, and the priority score are calculated using a machine learning technique.

9. The method of claim 1, wherein the optimization function groups the traffic demand with a plurality of other traffic demands.

10. The method of claim 9, wherein the optimization function aggregates some nodes of the plurality of nodes into a super-node and aggregates some links of the plurality of links into a span.

11. The method of claim 10, wherein the span is further aggregated into a bundle.

12. The method of claim 1, wherein the optimization function further minimizes an introduction of new assets into the telecommunication service provider network.

13. The method of claim 1, wherein the optimization function further maximizes a use of existing assets of the telecommunication service provider network.

14. The method of claim 1, wherein the optimization function further minimizes a length of a span in the telecommunication service provider network.

15. The method of claim 1, wherein the optimization function further minimizes traffic regeneration on diverse routes in the telecommunication service provider network.

16. The method of claim 1, wherein the optimization function further optimizes types of traffic spread across multiple routes in the telecommunication service provider network.

17. A non-transitory computer-readable medium storing a first set of instructions which, when executed by a processor, cause the processor to perform operations, the operations comprising:
- calculating a first plurality of health scores, where each health score of the first plurality of health scores quantifies a health of a node in a telecommunication service provider network, and where the node is one of a plurality of nodes representing a plurality of connectivity points in the telecommunication service provider network;
- calculating a second plurality of health scores, where each health score of the second plurality of health scores quantifies a health of a link in the telecommunication service provider network, and where the link is one of a plurality of links connecting individual nodes of the plurality of nodes;
- calculating a priority score that quantifies an importance of a traffic demand supported by the telecommunication service provider network; and
- generating a route using some of the plurality of nodes and some of the plurality of links, wherein the route is calculated based at least in part on the first plurality of health scores, the second plurality of health scores, the priority score, and an optimization function that is based on a historical network measure, wherein the route delivers the traffic demand from a source to a destination in a manner that meets a need of the traffic demand without exceeding the need of the traffic demand by more than a threshold, and wherein the optimization function minimizes a use of assets of the telecommunication service provider network while maintaining an optimal route diversity.

18. A device comprising:
a processor; and
a computer-readable medium storing a set of instructions which, when executed by the processor, cause the processor to perform operations, the operations comprising:
- calculating a first plurality of health scores, where each health score of the first plurality of health scores quantifies a health of a node in a telecommunication service provider network, and where the node is one of a plurality of nodes representing a plurality of connectivity points in the telecommunication service provider network;
- calculating a second plurality of health scores, where each health score of the second plurality of health scores quantifies a health of a link in the telecommunication service provider network, and where the link is one of a plurality of links connecting individual nodes of the plurality of nodes;
- calculating a priority score that quantifies an importance of a traffic demand supported by the telecommunication service provider network; and
- generating a route using some of the plurality of nodes and some of the plurality of links, wherein the route is calculated based at least in part on the first plurality of health scores, the second plurality of health scores, the priority score, and an optimization function that is based on a historical network measure, wherein the route delivers the traffic demand from a source to a destination in a manner that meets a need of the traffic demand without exceeding the need of the traffic demand by more than a threshold, and wherein the optimization function minimizes a use of assets of the telecommunication service provider network while maintaining an optimal route diversity.

\* \* \* \* \*